United States Patent [19]

Schmitt et al.

[11] Patent Number: 4,797,529
[45] Date of Patent: Jan. 10, 1989

[54] STUD WELDING APPARATUS

[75] Inventors: Klaus G. Schmitt, Giessen; Wolfgang Schmidt, Reiskirchen, both of Fed. Rep. of Germany

[73] Assignee: Emhart Enterprises Corp., Farmington, Conn.

[21] Appl. No.: 203,535

[22] Filed: May 23, 1988

Related U.S. Application Data

[63] Continuation of Ser. No. 036,046, Apr. 8, 1987, abandoned.

[30] Foreign Application Priority Data

Apr. 8, 1986 [DE] Fed. Rep. of Germany ....... 3611823

[51] Int. Cl.⁴ .............................................. B23K 9/20
[52] U.S. Cl. ........................................ 219/99; 219/98; 219/130.31
[58] Field of Search .................. 219/98, 99, 130.31

[56] References Cited

U.S. PATENT DOCUMENTS

| 3,825,717 | 7/1974 | Hughes, Jr. ................. | 219/98 |
| 4,156,808 | 6/1984 | Wilkinson et al. .......... | 219/98 |
| 4,241,285 | 12/1980 | Golonka, Sr. et al. ...... | 219/98 |

FOREIGN PATENT DOCUMENTS 1615517 6/1970 Fed. Rep. of Germany.
3130389 2/1983 Fed. Rep. of Germany.

Primary Examiner—Clifford C. Shaw
Attorney, Agent, or Firm—Thomas S. Szatkowski

[57] ABSTRACT

Control circuit for arc welding components to workpieces, in which a component is placed on to a workpiece by a weld gun and after a welding stroke is lifted from the workpiece in a return stroke by igniting a pre-current arc and is brought up to the workpiece again in a forward stroke during the burning of an interconnected welding arc, in which a sequencing control determines the tripping moments of return stroke and forward stroke as well as of the welding arc and a monitoring voltage is bypassed from the pre-current arc ignited at the welding point, characterized in that the monitoring voltage (V) is converted into a correction voltage (line 27) by means of a set-point comparator (25) and is superposed on a control voltage (line 18) for principally controlling a high-frequency modulated switching mode power supply unit (15) and said switching mode power supply unit (15), in accordance with the thus corrected control voltage, adjusts its output current (lines 13,14) during the respective welding operation to the resistance value of the pre-current arc established by the monitoring voltage (V) representing the respective welding data.

25 Claims, 4 Drawing Sheets

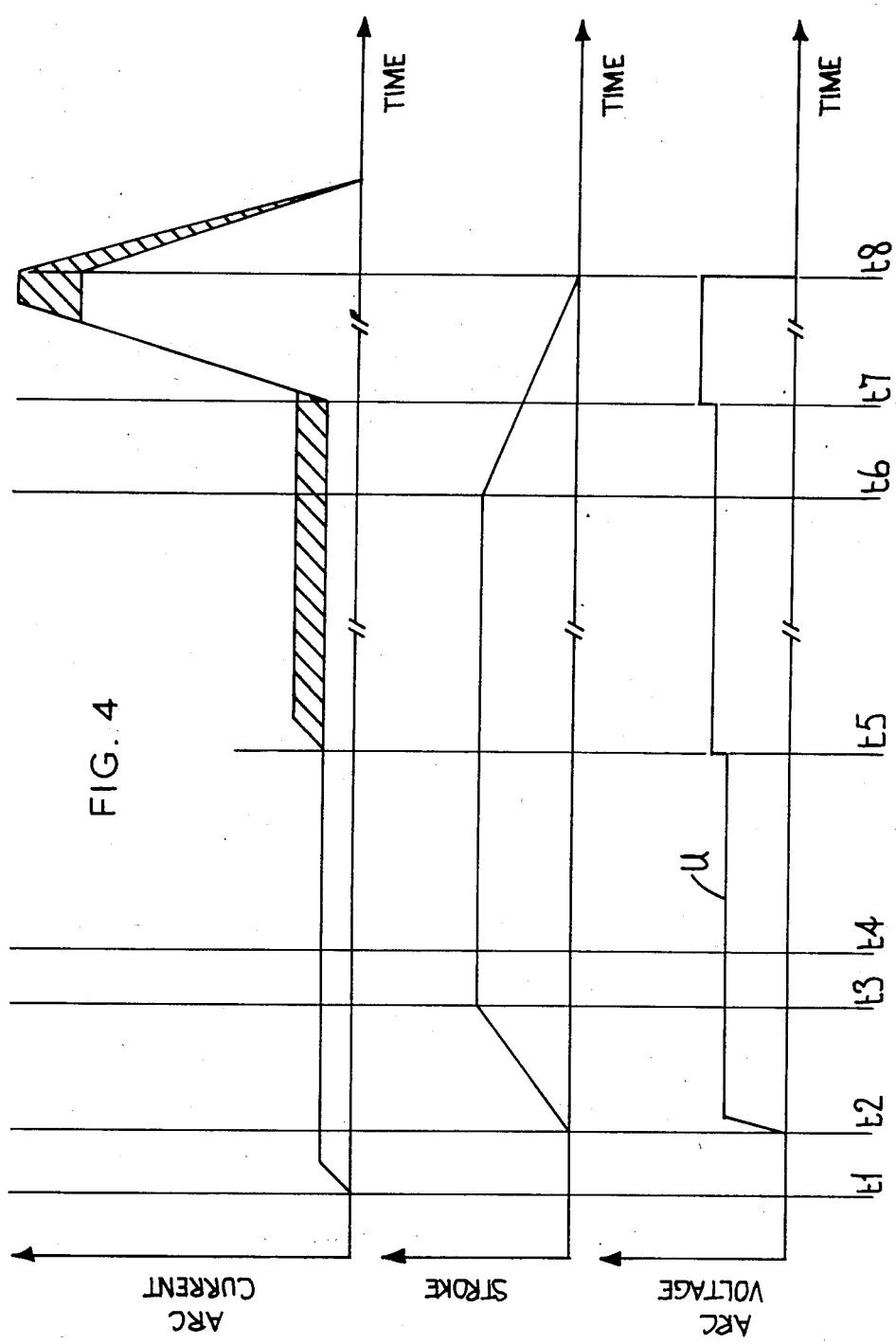

STUD WELDING APPARATUS

This is a continuation of co-pending application Ser. No. 036,046 filed on Apr. 8, 1987, now abandoned.

BACKGROUND OF THE INVENTION

The present invention is concerned with a control circuit for arc welding components to workpieces, in which a component is placed on to a workpiece by a weld gun and after a welding stroke is lifted from the workpiece in a return stroke by igniting a pre-current arc and is brought up to the workpiece again in a forward stroke during the burning of an interconnected welding arc, in which a sequencing control determines the tripping moments of return stroke and forward stroke as well as of the welding arc and a monitoring voltage is bypassed from the pre-current arc ignited at the welding point.

A circuit of this kind is known from German DE-OS No. 31 30 389. In this circuit a signal from the monitoring voltage tapped off on the pre-current arc is bypassed by means of a voltage discriminator as the monitoring voltage rises above or falls below certain voltage values. In these cases there are unfavourable conditions in the weld area for the welding to be carried out, e.g. a greasy surface, which is indicated by a higher monitoring voltage, or a current bridge in the weld area, which leads to a lowering of the monitoring voltage. If such variations in the monitoring voltage are detected in this known circuit, then the further cycle of the started welding operation can be discontinued and an alarm sounded. No other intervention in the welding operation takes place. If the welding operation is switched off before its completion, then this will produce—most certainly by the action of the pre-current arc—a weld area, which is no longer suitable for subsequent perfect welding. If the weld gun cannot be switched off before the completion of the welding operation on account of the speed of the sequence of the welding operations, then non-perfect welding results, which because of the alarm can then be marked and removed.

Additionally it is known from German DE-OS No. 16 15 517 in an electrical control circuit for welding of weld studs to measure the welding current and to switch the latter off prematurely, if its current intensity falls below or above a specified range.

It is an object of the present invention to even out the welding conditions which vary from weld area to weld area and to obtain perfect welds even in unfavourable conditions.

BRIEF DESCRIPTION OF THE INVENTION

According to the present invention we provide a control circuit for arc welding components to workpieces, in which a component is placed on to a workpiece by a weld gun after a welding stroke is lifted from the workpiece in a return stroke by igniting a pre-current arc and is brought up to the workpiece again in a forward stroke during the burning of an interconnected welding arc, in which a sequencing control determines the tripping moments of return stroke and forward stroke as well as of the welding arc and a monitoring voltage is bypassed from the pre-current arc ignited at the welding point, wherein the monitoring voltage is converted into a correction voltage by means of a set-point comparator and is superposed on a control voltage for principally controlling a high-frequency modulated switching mode power supply unit and the switching mode power supply unit, in accordance with the thus corrected control voltage, adjusts its output current during the respective welding operation to the resistance value of the pre-current arc established by the monitoring voltage representing the respective welding data.

The invention is based on the fact that, by means of the switching mode power supply unit modulated to high-frequency, on the one hand a particularly quick control of the welding current delivered from the switching mode power supply unit to the welding area is possible, and, on the other hand, practically any current curve can be adjusted by means of the switching mode power supply unit immediately at its output by controlling its modulation ratio. Thus, by means of the correcting voltage derived from the monitoring voltage, the switching mode power supply unit is re-adjusted immediately after measuring the monitoring voltage proportionately to the deviation of the monitoring voltage from the desired value, whereby the switching mode power supply unit after measuring the monitoring voltage can re-adjust the latter even during the life of the pre-current arc and, above all, can also influence the welding arc in the required way. If for example an increased monitoring voltage indicates for instance an undesirable layer of grease in the welding area, then an increase of the current intensity of the pre-current arc can be allowed for a certain time, so that the grease in the welding area is completely burned away by the increased pre-current. It is also possible additionally to take into account the resistance in the welding area increased by the layer of grease by that also the welding itself is raised. Moreover, the pre-current may be extended or shortened beyond its normal duration. The same applies to the welding current. This individual consideration of the variation in welding conditions from welding to welding enables constant good welding results to be achieved.

The control voltage controlling the switching power supply can advantageously be varied by comparing the monitoring voltage and the set-point comparator connected to a programmable microprocessor though an analogue/digital converter, which adjusts the respective control voltage by making correction to an associated voltage curve for controlling the switching power supply unit in accordance with the output voltage of the set-point comparator constituting the correcting voltage and corrects the tripping moments for return stroke and welding arc in the sequencing control. The microprocessor serves in this case to determine, according to a pattern programmed into it, for each output voltage value of the set-point comparator the appertaining voltage value of the control voltage and its duration and possibly to deliver it through a further digital/analogue converter to the switching mode power supply unit and the sequencing control, so that in the latter a certain current curve form is set by repeatedly changing the modulation ratio.

The technology of switching mode power supply units is known. The fundamentals for a high-capacity switching mode power supply unit suitable for use in the present invention were described at the Ninth International PCI'84 Conference, held at Paris in October 1984 and reported in PCI OCTOBER 1984 PROCEEDINGS (Intertec Communications Inc. USA) at pages 1 to 9. The switching mode power supply unit used within the scope of the invention is described in our copending German patent application No. P36 11 825.7 "Switching mode power supply unit for supplying power to equipment consuming heavy currents", which particularly relates to electrical welding apparatus.

Since the switching mode power supply unit modulated with high-frequency makes possible a particularly quick control of the welding current supplied by said switching mode power supply unit, one can advantageously measure the monitoring voltage during the life of the pre-current arc and the welding arc in order to bypass a signal from the short-circuit of the welding arc at the end of the forward stroke to switch off the switching mode power supply unit. The switching off of the welding current, which takes place at the same time the switching mode power supply unit is switched off, is thus actually made dependent on the short-circuit of the welding arc and, thus on immersion of the respective weld stud into the melt on the workpiece.

By means of the switching mode power supply unit it is thus possible, in accordance with the monitoring voltage, to adjust the output current of the switching mode power supply unit in respect of its amperage, its duration and also with respect to the ascending and descending flanks, so that the output current curve of the switching mode power supply unit is adjusted to the measured resistance value of the pre-current arc.

The adjustment of the output current curve of the switching mode power supply unit can be incorporated the sequencing control so that the sequencing control passes to the switching mode power supply unit, in accordance with the monitoring voltage, the tripping moment of the welding arc, in a range from advance to retardation in relation to the tripping moment of the forward stroke. This allows particularly extreme short welding times to be set, as for example up to one millisecond, whereby these welding times are shorter than the duration of the forward stroke (movement) of the weld gun. Naturally, also welding times can also be achieved which are as long or longer than the duration of the forward stroke.

BRIEF DESCRIPTION OF THE DRAWINGS

A preferred embodiment of the invention will now be described in greater detail with reference to the accompanying drawings in which:

FIGS. 3 and 4 are diagrams showing the chronological sequence of the welding current, the weld stud stroke and the welding voltage.

DETAILED DESCRIPTION OF DRAWINGS AND PREFERRED EMBODIMENT

Figure 1:
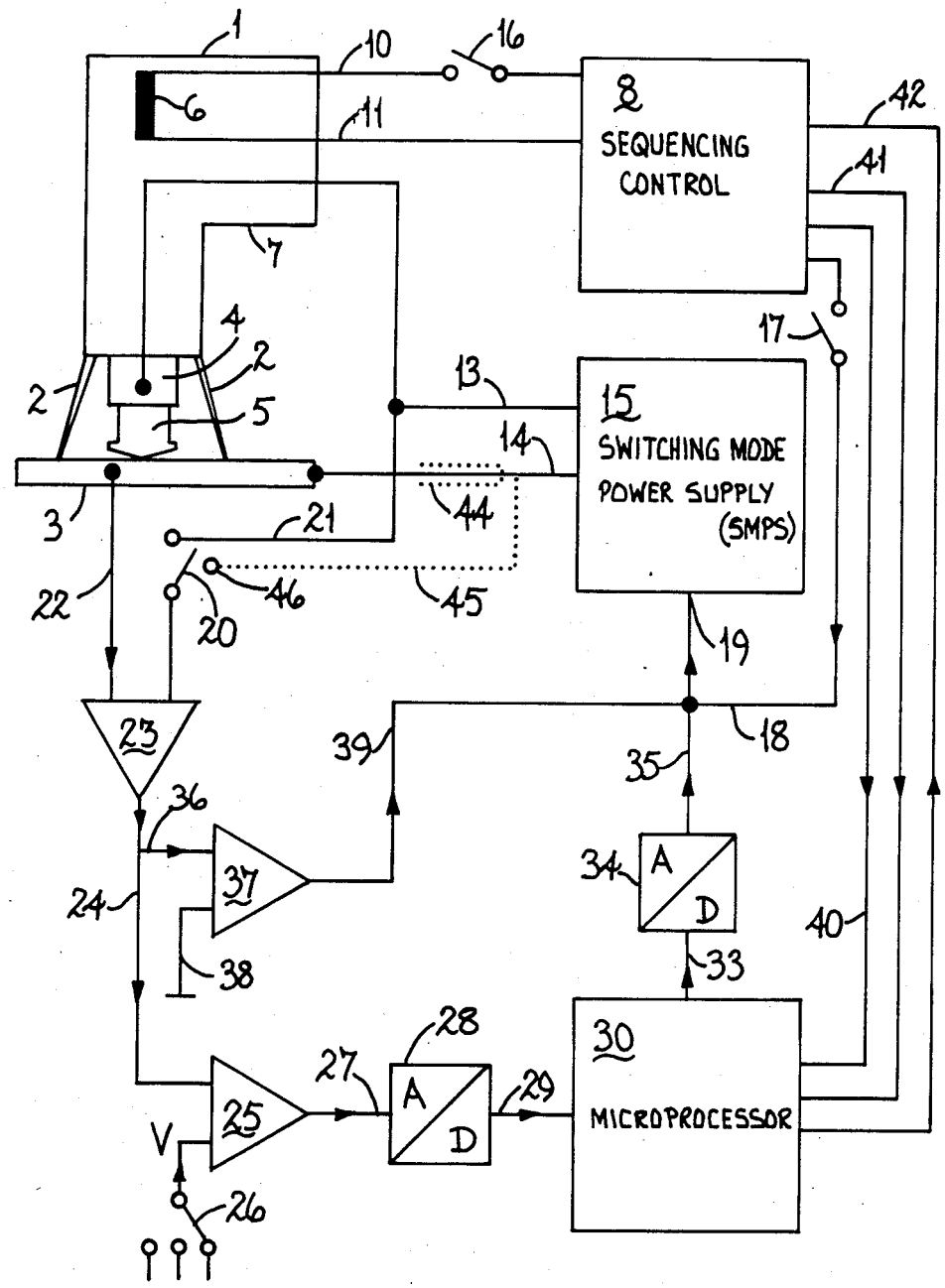
FIG. 1 is a functional block diagram of a control circuit in accordance with the invention.

In FIG. 1 is shown a weld gun 1 in a diagrammatic representation. From the forward end of the weld gun 1 project three supporting legs 2, which rest on workpiece 3. Between the supporting legs 2 is positioned a collet 4, which at its forward end holds a weld stud 5. The collet 4 is retractible into the stud welding gun 1 by means of a solenoid 6 acting in known manner against the action of a spring (not shown). By energising the solenoid 6, the collet 4, together with the weld stud 5, is retracted by up to 1.5 mm into the stud welding gun 1 (return stroke). When the solenoid 6 is de-energised the collet 4, together with the weld stud 5, is then pushed forward again (forward stroke) under the action of the spring. These procedures and the components required for it are well known.

Into handle 7 of the stud welding gun 1 run a number of wires, which are necessary for the normal operation of the stud welding gun 1. Across wires 10 and 11 runs the energising current for the solenoid 6. From the handle 7 runs additional wire 13, which carries not only the current of the pre-current arc, but also the current of the welding arc. Furthermore, the workpiece 3 is connected with wire 14, so that there exists a circuit comprising wire 13, collet 4, stud 5, workpiece 3 and wire 14. The wires 10 and 11 are connected to a sequencing control 8, which comprises a known assembly unit and is used in this form regularly in conjunction with stud welding guns. The wires 13 and 14 are connected to a switching mode power supply unit 15, which supplies the current for the pre-current arc and the welding arc. The sequencing control 8, which will be described in further detail below, trips switch 16 in a known way, by which at the timing point t2 the energising circuit for the solenoid 6 is closed and at the timing point t7 (FIG. 3) or t6 (FIG. 4) is opened (see also FIG. 2).

Figure 2:
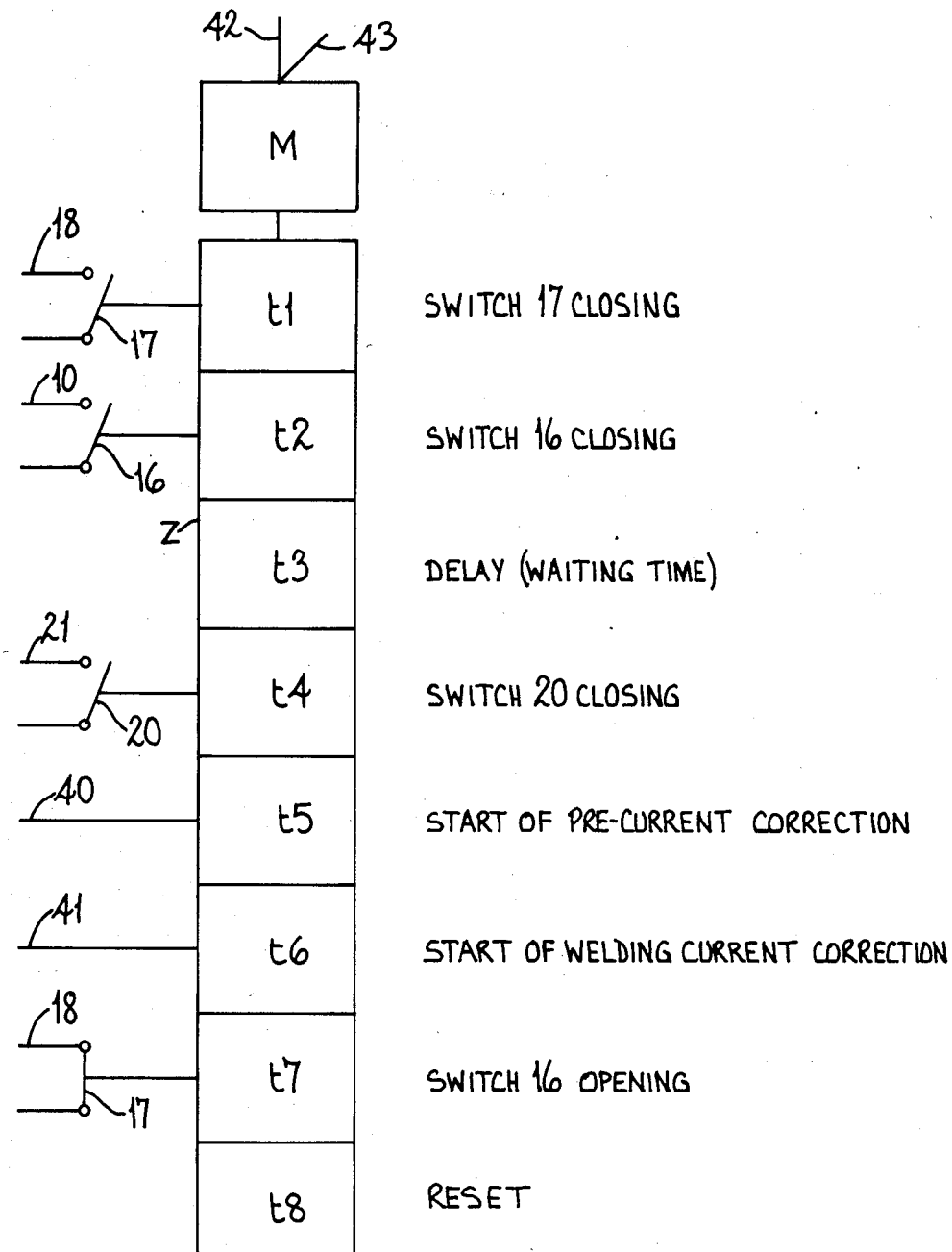
FIG. 2 shows the sequencing control (counting chain)
Figure 3:
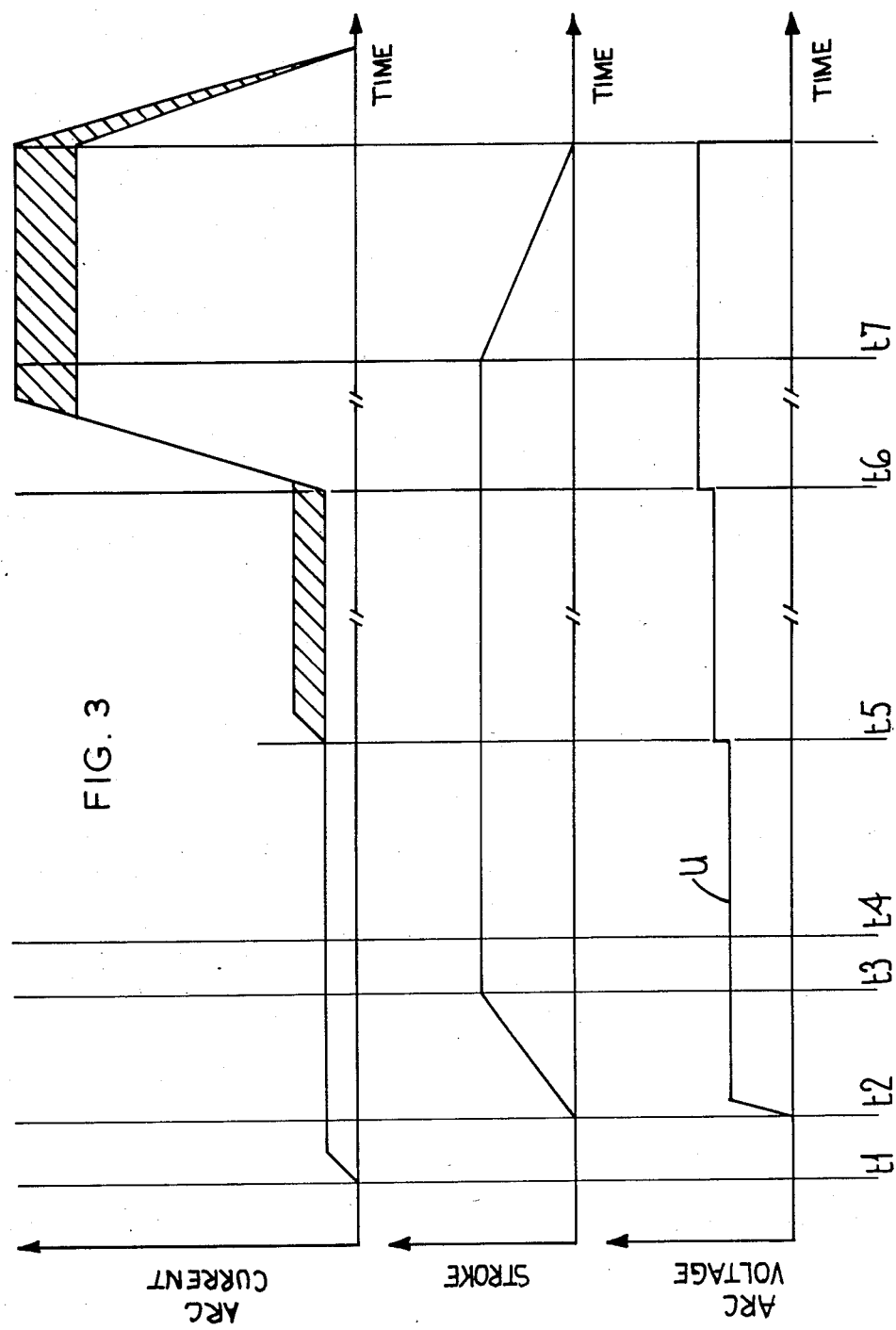

According to FIGS. 2, 3 and 4, switch 17 is closed at the timing point t1, which thereupon across wire 18 supplies the control voltage for the normal operation of the switching mode power supply unit 15 to its control input 19, whereupon the latter is put into circuit and supplies, in accordance with the amperage of the control voltage applied to the control input 19, a definite current across the wires 13 and 14 to the collet 4, the stud 5 and the workpiece 3. Taking this control as a basis, the switching mode power supply unit 15 is adjusted for an optimum welding operation relative to normal welding conditions (data), namely with respect to the pre-current and the welding current. On account of a further triggering pulse in the sequencing control 8, switch 16 is closed at the timing point t2, whereupon the solenoid 6 is energised and retracted. It thus lifts collet 4 together with stud 5 off workpiece 3 and in this way breaks the contact between weld stud 5 and workpiece 3. As a consequence the pre-current arc is drawn, whereby the current required for it flows across wires 13 and 14.

At the timing point t4, which follows the delay (waiting time) starting at the timing point t3, switch 20 is closed, which through wires 21 and 22 feeds monitoring voltage U applied to weld stud 5 and workpiece 3, determined by the pre-current arc, to buffer amplifier 23, the output voltage of which is an equivalent for the voltage of the pre-current arc. This voltage U is fed by wire 24 to set-point comparator 25, which receives a set-point voltage V through rotary switch 26. This voltage V is selectively adjustable according to the type of stud to be welded (e.g. aluminum or steel). Set-point comparator 25 now delivers, according to the comparison made by it between the actual voltage supplied over wire 24 and the desired set-point voltage V, a correction voltage across wire 27, which is converted by analogue/digital converter 28 in known manner into a digital voltage curve, which represents the analogue correction voltage delivered over wire 27. The digital correction voltage delivered by analogue/digital converter 28 now passes to microprocessor 30, which converts the correction voltage supplied to it into a digitalised voltage curve via wire 33, which, after conversion by digital/analogue converter 34, arrives via wire 35 at control input 19 of switching mode power supply unit 15, to which is additionally applied the control voltage delivered over wire 18 (see above), which thus superposes the voltage curve delivered by digital/analogue converter 34. Microprocessor 30 converts therefore, according to a pattern programmed into it, the correction voltage fed to it into a specific associated voltage curve, which is suitable for the correction of the control voltage of switching mode power supply unit 15. Microprocessor 30 is thereby thus used in known manner for a conversion of a digital value into a specifically associated other digital value or chain of digital values, whereby the programmability of microprocessor 30 is used to its full effect, since it allows for patterns to be stored in it, to which are allotted respective digital values. The storing of the respective pattern can be effected by plugging in a non-volatile memory element (ROM).

Microprocessor 30 is impulsed for the delivery of a digitalised voltage curve to digital/analogue converter 34 over wire 40 coming from sequencing control 8. Sequencing control 8 produces at the timing point t5 a signal which is delivered via wire 40 to microprocessor 30. From the ensuring delivery of the digitalised voltage curve digital/analogue converter 34 then produces in the above-described manner an analogue voltage curve, which is superposed on the control voltage at the control input 19 of the switching mode power supply unit 15 and consequently makes a correction of this control voltage so that the condition of the welding area detected by the monitoring voltage U tapped off over wires 21 and 22 is taken into consideration, which will be explained in more detail below by way of an operational example.

If now, for example, an increased voltage over wires 21 and 22 is measured in relation to the normal monitoring voltage U of the pre-current arc due to an undesired layer of grease on workpiece 3, then set-point comparator 25 produces a respective correction voltage across wire 27, which indicates the deviation from the desired voltage. This correction value then brings about the correction of the control voltage at input 19 of switching mode power supply unit 15. Switching mode power supply unit 15 thus produces a defined output current curve due to a respective change of the pulse duty factor of the high frequency scanning the switching mode power supply unit, which, for example, in the pre-current from t5 and also in the welding current from t6, brings about an intensification of these currents, by which the aforementioned layer of grease is completely burned away and the welding current is thus presented to a clean welding area. As a result of the aforementioned impulse over wire 40, the voltage curve is produced across wire 35 within the period t5 to t6 (see FIGS. 3 and 4). The switching mode power supply unit 15 is supplied with the corrected control voltage as from the timing point t5. As FIGS. 3 and 4 show, the corrected control voltage brings about an intensification of the pre-current depicted by the shaded area between t5 and t6 and thus a burning away of the said layer of grease.

At the timing point t6 a signal is delivered from sequencing control 8 to microprocessor 30 over wire 41 which induces the latter to extend the correction of the control voltage carried out by it to the welding arc, since at that time an intensified control voltage is supplied to switching mode power supply unit 15 across wire 18 from sequencing control 8, which commutates switching mode power supply unit 15 from pre-current to the welding current. Had a layer of grease been previously detected on workpiece 3 as described above, then a correction of the control voltage would be carried out by microprocessor 30 in the way described above, leading to a slightly intensified welding current (see shaded area in FIGS. 3 and 4 following the timing point t6).

At the timing point t7 de-energisation of the solenoid 6 of the weld gun 1 takes place by the opening of switch 16 as a result of a respective impulse from sequencing control 8, so that stud 5 is urged to move towards workpiece 3 and ultimately comes into contact with it, where it meets a fused mass as generally known and is thus welded to workpiece 3. Upon stud 5 making contact with workpiece 3 at the timing point t8, a short circuit is produced between stud 5 and workpiece 3, which results in a breakdown of the arc voltage (see declining curve of the arc voltage after the timing point t8 in FIGS. 3 and 4). This breakdown of the arc voltage is signalled as voltage jump across wires 21 and 22, buffer amplifier 23 and wire 36 to differentiating element 37, which produces a stop signal from this voltage jump, which is delivered via wire 39 to control input 19 of switching mode power supply unit 15, which switches off due to a respective potential of this signal and thus ends the welding operation.

Microprocessor 30 is connected furthermore to sequencing control 8 across wire 42, in order to bring about a change of the time sequence in said sequencing control 8. Sequence control 8 comprises a counting chain Z (FIG. 2) having a series of stages, upon their activation signals are released at the points of time t1 to t8. The counting chain is advanced by multivibrator M put in the circuit at the head of it. It thus concerns a conventional controlling means for a sequencing control. Multivibrator M has control input 43 (FIG. 2), which receives a potential from microprocessor 30 via wire 42. According to the level of potential, multivibrator M can either be stopped or tripped into a higher frequency position, by which it then respectively advances counting chain Z connected thereto. In this way it is possible for example to prolong the period, if necessary, between t5 and t6, so that a respective potential is delivered from microprocessor 30 via wire 42 to multivibrator M. The same applies also for example to the period between t6 and t7.

With the aid of the FIGS. 3 and 4, already referred to above, two different operational examples will now be described. In both of these Figures are depicted, in three superposing diagrams, the time sequence in the horizontal axis and in the vertical axis, the arc current, the movement of the weld stud and the arc voltage. The respective operational cycle starts at the timing point t1, at which by closure of switch 17 (FIG. 1) is switched on switching mode power supply unit 15 and thus the pre-current over weld stud 5 resting on workpiece 3. At the timing point t2 by closure of switch 16 solenoid 6 is then energised and weld stud 5 starts to lift from workpiece 3, by which in the above-described way the pre-current arc is drawn and thus produces a respective arc voltage. At the timing point t3 weld stud 5 has then attained its rearward end position. Between the timing points t3 and t4 there is a delay for the pre-current arc to stabilise. During the period between the timing points t4 and t5 takes place, as described above, the evaluation of the monitoring voltage tapped off over wires 21 and 22. Assuming that, as a result of the measured monitoring voltage, a correction of the control voltage at input 19 of switching mode power supply unit 15 is found to be necessary, two different monitoring voltages in two operational examples are measured, which result into two respectively different corrections, which will be described individually with the aid of FIGS. 3 and 4 in the following paragraphs.

According to FIG. 3, the pre-current arc is maintained by an intensified current from the timing point t5, depicted by the shaded area between the timing points t5 and t6. This is expressed in the diagram depicting the arc voltage by an increase of the arc voltage. At the timing point t6 the welding arc is then switched on in the above-described way, whereby for the pre-current arc a correction of the current value of the welding arc is carried out, namely to the effect of a welding current intensity symbolised by the shaded area. This intensified welding current prevails until the timing point t8, which is shown in the diagram of the arc voltage by a respectively raised curve. Previously at the timing point t7 solenoid 6 had been de-energised, whereupon weld stud 5 was urged to move towards workpiece 3 and arrives at the latter at the timing point t8. The welding arc is thus short-circuited, so that its voltage subsides suddenly to the value zero. As a result of this voltage jump, switching mode power supply unit 15 is switched off in the above-described way, so that it results in the current dropping rapidly after the timing point t8.

The operational example according to FIG. 4, concerns principally the same sequences and similar corrections, only the switching-on moment of the welding arc is deferred to a later moment compared with the operational example of FIG. 3. In the case of the operational example according to FIG. 4, the de-energisation of solenoid 6 takes place at the timing point t6, at which however the pre-current arc is still burning. The switching-in of the welding current arc takes place then according to FIG. 4 at the timing point t7, which lies after the de-energisation of solenoid 6 (timing point t6). The switching off of the welding current arc takes place then as in the operational example according to FIG. 3, when weld stud 5 comes to abut against workpiece 3 at the timing point t8.

It can be seen from the comparison of the FIGS. 3 and 4, that on the strength of the control circuit described by way of the FIGS. 1 and 2 the tripping moment for the switching in of the welding arc can lie within a relatively wide range, namely in a range allowing advance of this tripping moment and retardation with respect to the de-energising of solenoid 6, (tripping moment of the forward stroke). The control circuit thus permits the welding arc to be switched on over a period of time, which is shorter, as long or longer than it takes for the weld stud to move down on to the workpiece 3 (period t7 to t8 in FIG. 3; period t6 to t8 in FIG. 4).

The above explanation of the control circuit in accordance with FIG. 1 was based on the measuring of the monitoring voltage over wires 21 and 22, which was given by the voltage of the pre-current arc. It is also possible to use the current intensity (amperage) of the pre-current arc as criterion for the condition of the welding area. A suitable circuit is drawn into FIG. 1 in dotted lines. Into line 14 is drawn measuring resistor 44, at which drops a voltage when the pre-current arc is closed, which is measured over wires 45 and 22. Switch 20 is placed for this purpose on switch point 46 at the end of line 45. Since in the case of measuring resistor 44 an extremely low resistance is necessary to avoid losses, there is obtained from this measurement a correspondingly small voltage, requiring conforming modification of the further components of the circuit, particularly buffer amplifier 23.

We claim:
1. An apparatus for arc welding a stud onto the surface of a workpiece which comprises:
   means for gripping said stud;
   means for initially positioning said stud adjacent said surface;
   means for effecting a return stroke to bring said stud away from said surface;
   means for igniting a pre-current arc during said return stroke;
   means for initially setting the magnitude of said pre-current arc;
   means for initially setting the time duration of said pre-current arc;
   means for effecting a forward stroke;
   means for igniting a main welding arc during said forward stroke;
   means for initially setting the magnitude of said main welding arc;
   means for initially setting the time duration of said main welding arc;
   means for sensing the voltage of said pre-current arc;
   means for comparing the voltage of said pre-current arc to a desired value to determine a correction voltage;
   means for sensing said correction voltage;
   means for changing the time duration of said pre-current arc responsive to said correction voltage;
   means for changing the magnitude of said pre-current arc responsive to said correction voltage;
   means for changing the magnitude of said main welding arc responsive to said correction voltage; and
   means for changing the time duration of said main welding arc responsive to said correction voltage.
2. The apparatus of claim 1 wherein said gripping means comprises a collet.
3. The apparatus of claim 1 wherein said means for effecting forward and return strokes comprises a solenoid.
4. The apparatus of claim 1 wherein said means for setting time duration comprises a sequencing control.
5. The apparatus of claim 1 wherein said means for setting the magnitude of said pre-current and main welding arcs comprises a high frequency switching mode power supply.
6. The apparatus of claim 1 wherein said means for changing the time duration of said arcs comprises a programmable microprocessor.
7. The apparatus of claim 1 wherein said means for changing the magnitude of said arcs comprises a programmable microprocessor.
8. The apparatus of claim 1 wherein said means for comparing voltage of said pre-current arc to a desired value comprises a set point comparator.
9. The apparatus of claim 8 wherein said set point comparator is connected to said changing means via an analogue/digital converter.
10. An apparatus for arc welding a stud onto the surface of workpiece comprising:
   a welding gun, capable of sequentially placing a stud in contact with said workpiece, displacing said stud out of contact with said workpiece, and placing said stud again in welding contact with said workpiece;

a high frequency, switching mode power supply adapted to provide an initial pre-current arc, and an immediately following main welding arc;

sequencing control means, capable of controlling movement of said welding gun, wherein controlled movement of said gun in displacing said stud out of contact with said workpiece ignites said pre-current arc, and of controlling the timing of said main welding arc;

a microprocessor, adapted to influence the performance of said sequencing control means and said switching mode power supply; and means to measure a monitoring voltage, said monitoring voltage being derived from said pre-current arc; said means being capable of providing the monitoring voltage so measured to said microprocessor, wherein said microprocessor influences said sequencing control means and said switching mode power supply in accordance with said measured monitoring voltage.

11. The apparatus according to claim 10, wherein said sequencing control means influences said switching mode power supply via a control voltage curve so that said switching mode power supply delivers a predetermined welding current to said weld gun for normal welding conditions.

12. The apparatus according to claim 11, wherein said microprocessor superimposes a variable output voltage curve on said control voltage curve provided by said sequencing control means to vary said welding current, provided by said switching mode power supply, in response to said measured monitoring voltage provided by said means to measure said monitoring voltage.

13. A method for controlling arc welding of components, such as a stud, onto a workpiece, through the use of a control circuit, comprising the steps of:

placing a component on a workpiece with a welding gun;

lifting said component from the workpiece in a return stroke to ignite a pre-current arc;

deriving a monitoring voltage from said pre-current arc;

deriving a correction voltage from said monitoring voltage;

using said correction voltage to determine the individual welding conditions present at each individual weld;

interpreting said correction voltage with a programmable microprocessor which is further used to set a voltage process curve;

controlling a high-frequency switching mode power supply, used to supply current in the welding operation, with said microprocessor according to said voltage process curve;

superimposing an output voltage curve of said microprocessor on a control voltage curve, which presets the switching mode power supply, to control the switching mode power supply by the voltage process curve in a way so that the switching mode power supply provides output current dependent upon the pre-current arc in an immediately following main welding arc superimposed on said pre-current arc and set in accordance with said welding conditions and interpreted by said microprocessor through said monitoring voltage; and placing said component into contact with said workpiece again in a forward stroke during said main welding arc.

14. A method according to claim 13, including transforming said control voltage into a correction voltage by means of a set-point comparator to which a reference voltage, representing the type of said stud to be welding, is supplied.

15. The method according to claim 13, including correcting the triggering moments for return stroke and main welding arc in the sequencing control with the microprocessor.

16. The method according to claim 15, including measuring the monitoring voltage over the duration of the pilot arc and the main welding arc, and deriving a signal from the short circuit of the main welding arc at the end of the forward stroke to switch off the switching mode power supply unit.

17. The method according to claim 15, including providing an output current from said switching mode power supply unit with an amperage set in accordance with the monitoring voltage.

18. The method according to claim 15, including providing an output current from said switching mode power supply unit with a duration set in accordance with the monitoring voltage.

19. The method according to claim 15, including setting the speed in which said switching mode power supply unit provides its maximum output current and terminates said current in accordance with the monitoring voltage.

20. The method according to claim 15, including timing the main welding arc with the triggering moment of the forward stroke of said weld gun, with said sequencing control, in accordance with the monitoring voltage 21. The method according to claim 13, including measuring the monitoring voltage over the duration of the pilot arc and the main welding arc, and deriving a signal from a short circuit of the main welding arc at the end of the forward stroke to switch off the switching mode power supply unit.

22. The method according to claim 13, including providing an output current from said switching mode power supply unit with an amperage set in accordance with the monitoring voltage.

23. The method according to claim 13, including providing an output current from said switching mode power supply unit with a duration set in accordance with the monitoring voltage.

24. The method according to claim 13, including setting the speed in which said switching mode power supply unit provides its maximum output current and terminates said current in accordance with the monitoring voltage.

25. The method according to claim 13, including timing the main welding arc with the triggering moment of the forward stroke of said weld gun, with said sequencing control, in accordance with the monitoring voltage.

* * * * *